(12) United States Patent
Cortopassi et al.

(10) Patent No.: US 7,725,607 B1
(45) Date of Patent: May 25, 2010

(54) METHOD AND SYSTEM FOR ENABLING PERSONAL DIGITAL ASSISTANTS AND PROTECTING STORED PRIVATE DATA

(75) Inventors: Michael Cortopassi, Arlington Heights, IL (US); Eric Fuhs, Crystal Lake, IL (US); Thomas Robinson, Crystal Lake, IL (US); Edward Endejan, Gurnee, IL (US)

(73) Assignee: PalmSource, Inc., Sunnyvale, CA (US)

( * ) Notice: Subject to any disclaimer, the term of this patent is extended or adjusted under 35 U.S.C. 154(b) by 0 days.

(21) Appl. No.: 10/887,550

(22) Filed: Jul. 7, 2004

Related U.S. Application Data

(63) Continuation of application No. 09/572,671, filed on May 16, 2000, now Pat. No. 6,769,036.

(51) Int. Cl.
*G06F 3/00* (2006.01)

(52) U.S. Cl. .............. 710/2; 710/8; 710/36; 710/72; 710/300; 713/300

(58) Field of Classification Search ............ 710/2, 710/8–20, 36, 37, 72, 104, 300–302; 709/213; 713/300
See application file for complete search history.

(56) References Cited

U.S. PATENT DOCUMENTS

| | | | | |
|---|---|---|---|---|
| 5,691,928 A * | 11/1997 | Okaya et al. | ............ | 708/135 |
| 5,748,912 A * | 5/1998 | Lee | ............ | 710/301 |
| 5,978,919 A * | 11/1999 | Doi et al. | ............ | 713/202 |
| 6,055,595 A * | 4/2000 | Tachibana et al. | ............ | 710/301 |
| 6,145,046 A * | 11/2000 | Jones | ............ | 710/301 |
| 6,165,021 A * | 12/2000 | Bourne | ............ | 439/630 |
| 6,216,230 B1 * | 4/2001 | Rallis et al. | ............ | 713/185 |
| 6,223,233 B1 * | 4/2001 | Kavanaugh et al. | ............ | 710/73 |
| 6,298,388 B1 * | 10/2001 | Taguchi | ............ | 710/12 |
| 6,353,870 B1 * | 3/2002 | Mills et al. | ............ | 710/301 |
| 6,397,285 B1 * | 5/2002 | Hashimoto et al. | ............ | 710/301 |
| 6,408,352 B1 * | 6/2002 | Hosaka et al. | ............ | 710/301 |
| 6,763,458 B1 * | 7/2004 | Watanabe et al. | ............ | 713/100 |
| 7,036,738 B1 * | 5/2006 | Vanzini et al. | ............ | 235/486 |

* cited by examiner

*Primary Examiner*—Eron J Sorrell
(74) *Attorney, Agent, or Firm*—Berry & Associates P.C.

(57) ABSTRACT

A method and system for enabling personal digital assistants (PDAs) and protecting stored private data. Specifically, one embodiment in accordance with the present invention includes a removable expansion card about the size of a postage stamp which plugs into a slot of a personal digital assistant. The removable expansion card, referred to as a personality card, is capable of storing all of a user's private information and data which is used within their personal digital assistant. By removing the personality card from the personal digital assistant, all of the user's private information and data may be removed from the personal digital assistant. Furthermore, the personal digital assistant may also be rendered totally or partially useless once the personality card is removed from it. There are several advantages associated with a personality card system in accordance with the present invention. For example, one of the advantages is that a user is able to restrict access to their stored private information and data by simply removing their personality card from their personal digital assistant. Furthermore, as personal digital assistants equipped with personality card slots become increasingly more common, a user will be able to continually carry around their personality card and enable a spare and locally available personal digital assistant with their private information when desired.

19 Claims, 13 Drawing Sheets

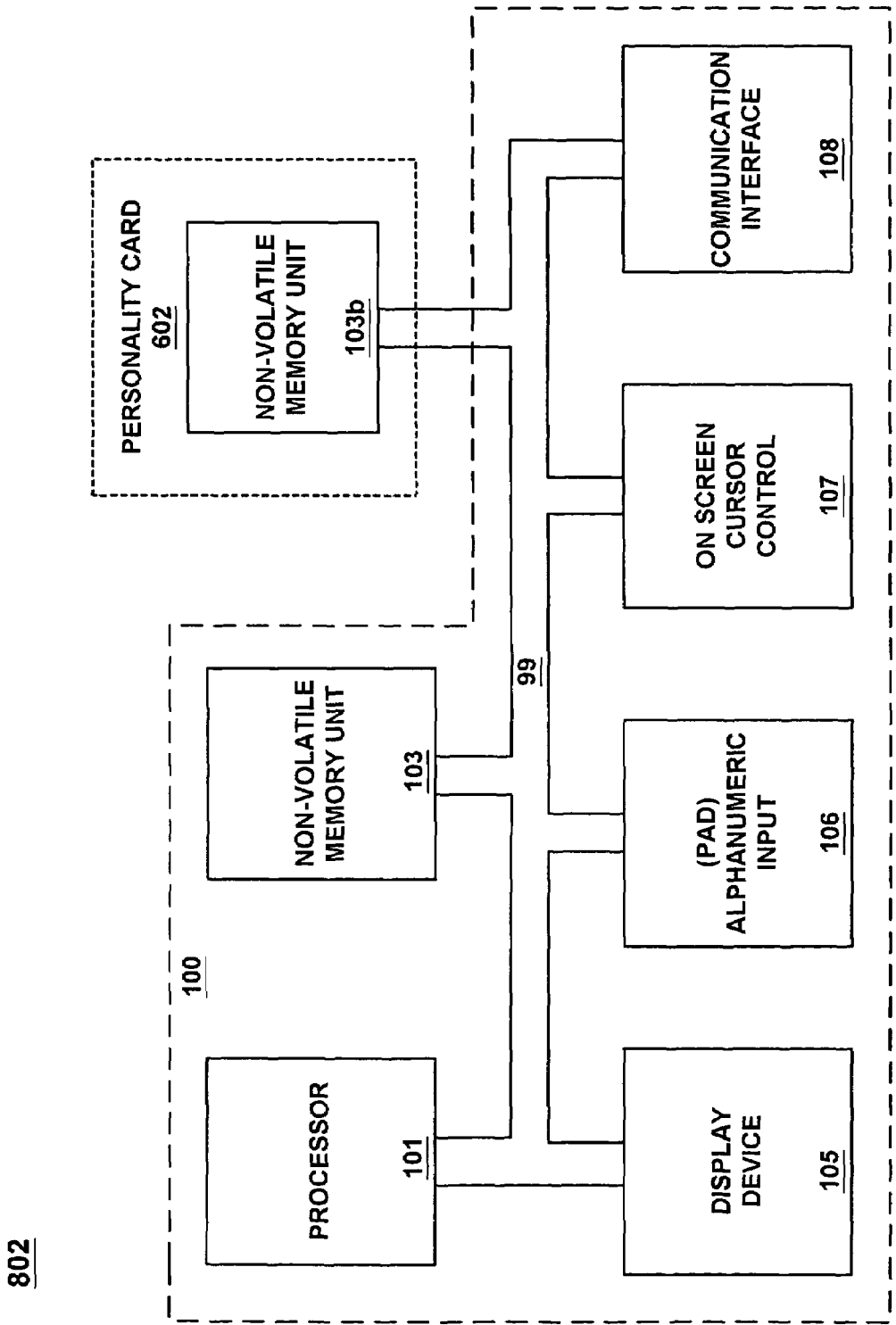

METHOD AND SYSTEM FOR ENABLING PERSONAL DIGITAL ASSISTANTS AND PROTECTING STORED PRIVATE DATA

This is a continuation of application(s) Ser. No. 09/572,671 filed on May 16, 2000 now U.S. Pat. No. 6,769,036.

TECHNICAL FIELD

The present invention generally relates to the field of portable electronic devices. More particularly, the present invention relates to the field of personal digital assistants (PDAs) and other similar types of portable electronic devices.

BACKGROUND ART

Computers and other electronic devices have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of a computer system or other type of electronic device is dramatically enhanced by coupling these type of stand-alone devices together in order to form a networking environment. Within a networking environment, users may readily exchange files, share information stored on a common database, pool resources, and communicate via electronic mail (e-mail) and via video teleconferencing. Furthermore, computers along with other types of electronic devices which are coupled to the internet provide their users access to data and information from all over the world. Computer systems have become useful in many aspects of everyday life both for personal and business uses.

Included within this broad category of computers and electronic devices is the personal digital assistant (commonly referred to as a PDA). Specifically, as the components required to build a computer system have been greatly reduced in size, new categories of computer systems have emerged. One of these new categories of computer systems is the personal digital assistant. A personal digital assistant is a portable computer system which is small enough to be held in the hand of its user and can be "palm-sized."

Since personal digital assistants are very small, full-sized keyboards are generally not efficient input devices. For instance, personal digital assistants using keyboards usually have keyboard devices that are so small that a user typically cannot touch-type on them. Many personal digital assistants employ a stylus and a digitizer pad as an input system. The stylus and digitizer pad work well for personal digital assistants because the arrangement allows a user to hold the personal digital assistant in one hand while writing with the stylus onto the digitizer pad with the other hand. A small on-screen keyboard image can also be used for data entry. Because of the elimination of the keyboard, personal digital assistants are very portable and tend to be carried by the user wherever they go, including on travel.

Furthermore, the personal digital assistant is usually a battery powered device that is typically used as an electronic organizer having the capability to store and display a wide range of information which can include numerous addresses and telephone numbers of business and personal acquaintances, financial information, daily appointments, along with various other personal information. In this manner, the personal digital assistant is able to consolidate a variety of information which is easily accessible by its user. Therefore, personal digital assistants are very useful and powerful devices.

It should be appreciated that even though there are many advantages associated with personal digital assistants, one disadvantage is that anyone in possession of someone else's personal digital assistant typically has unrestricted access to the variety of personal and private information stored within it. As such, if a personal digital assistant is misplaced or lost and falls into the wrong hands, the stored private information may be accessed and used for purposes detrimental to the owner of the personal digital assistant. Therefore, the private information stored by a personal digital assistant is typically accessible by any potential user of the device. Second, as personal digital assistants become more ubiquitous, it would be desired to take advantage of this fact to provide methods to make personal digital assistant usage easier.

DISCLOSURE OF THE INVENTION

Accordingly; what is needed is a method and system for restricting access to private information stored by a personal digital assistant. The present invention provides this advantage and others which will no doubt become obvious to those of ordinary skill in the art after having read the following detailed description of embodiments in accordance with the present invention.

Specifically, one embodiment in accordance with the present invention includes a removable expansion card about the size of a postage stamp which plugs into a slot of a personal digital assistant computer system. The removable expansion card, referred to as a personality card, is capable of storing all of a user's private information and data which is used within their personal digital assistant. By removing the personality card from the personal digital assistant, all of the user's private information and data may be removed from the personal digital assistant. Furthermore, the personal digital assistant may also be rendered totally or partially useless once the personality card is removed from it. There are several advantages associated with a personality card system in accordance with the present invention. For example, one of the advantages is that a user is able to restrict access to their stored private information and data by simply removing their personality card from their personal digital assistant. Furthermore, as personal digital assistants equipped with personality card slots become increasingly more common, a user will be able to continually carry around their personality card and enable a spare and locally available personal digital assistant with their private information when desired.

In another embodiment, the present invention includes a system for enabling and disabling a personal digital assistant computer system. The system includes a personal digital assistant computer system and a peripheral component adapted to couple to the personal digital assistant computer system. The peripheral component includes a memory device for storing data. In response to the peripheral component coupling to the personal digital assistant computer system, the peripheral component enables the personal digital assistant computer system. Additionally, in response to the peripheral component uncoupling from the personal digital assistant computer system, the peripheral component disables the personal digital assistant computer system.

In yet another embodiment, the present invention includes a method for enabling and disabling a personal digital assistant computer system. The method includes the step of coupling a peripheral component to a personal digital assistant computer system. The peripheral component includes a memory device for storing data. In response to the step of coupling the peripheral component to the personal digital assistant computer system, the method includes the step of enabling the personal digital assistant computer system. Furthermore, the method includes the step of accessing and modifying the data stored by the memory device of the peripheral component. Additionally, the method includes the step of uncoupling the peripheral component from the personal digital assistant computer system. In response to the step of uncoupling the peripheral component from the personal digital assistant computer system, the personal digital assistant computer system is disabled.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 8B is a logical block diagram of circuitry located within the personality card system of FIG. 6 in accordance with another embodiment of the present invention.

The drawings referred to in this description should not be understood as being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
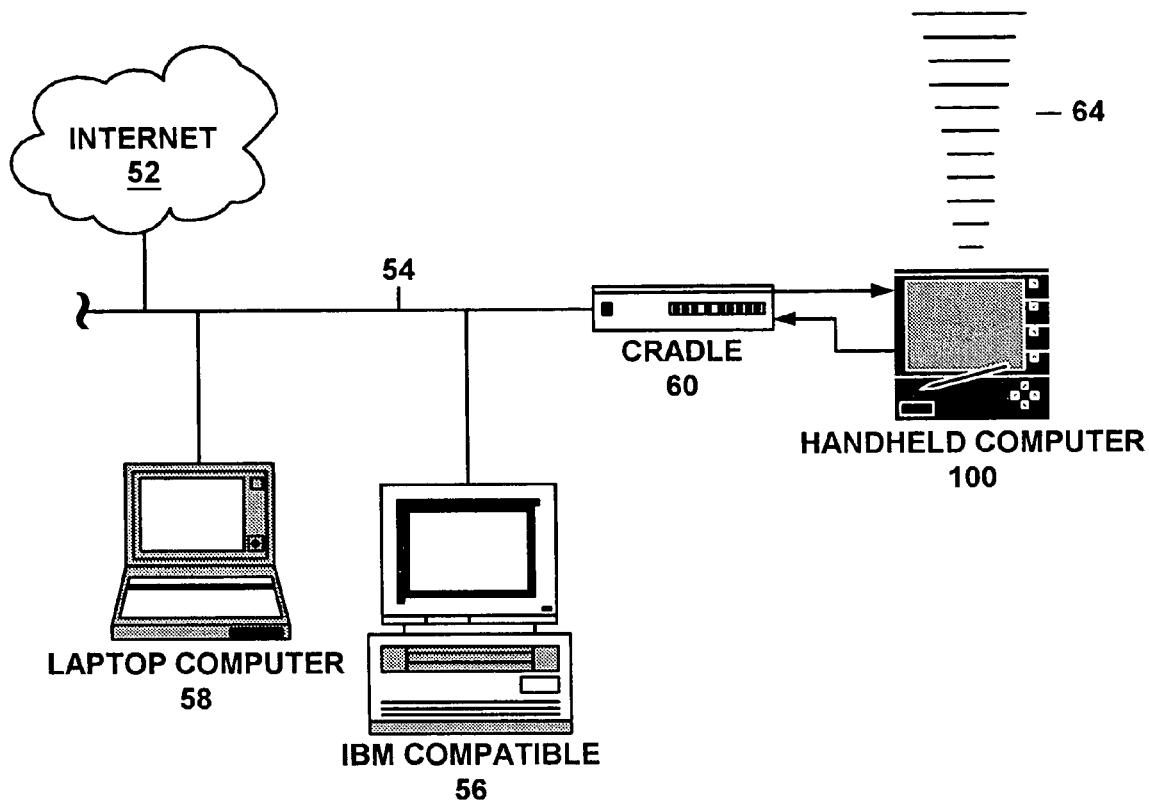
FIG. 1 is a system illustration of an exemplary personal digital assistant computer system connected to other computer systems and the Internet via a cradle device.

Referring now to FIG. 1, a system 50 that can be used in conjunction with the present invention is shown. It is appreciated that the personality card system of the present invention can be used in conjunction with any personal digital assistant and portable computer system and that system 50 is exemplary. It is further appreciated that the portable computer system 100 described below is only exemplary. System 50 comprises a host computer system 56 which can either be a desktop unit as shown, or, alternatively, can be a laptop computer system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet, Local Area Network (LAN), etc. Optionally, bus 54 can provide communication with the Internet 52 using a number of well known protocols.

Importantly, bus 54 is also coupled to a cradle 60 for receiving and initiating communication with a personal digital assistant computer system 100. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2A:
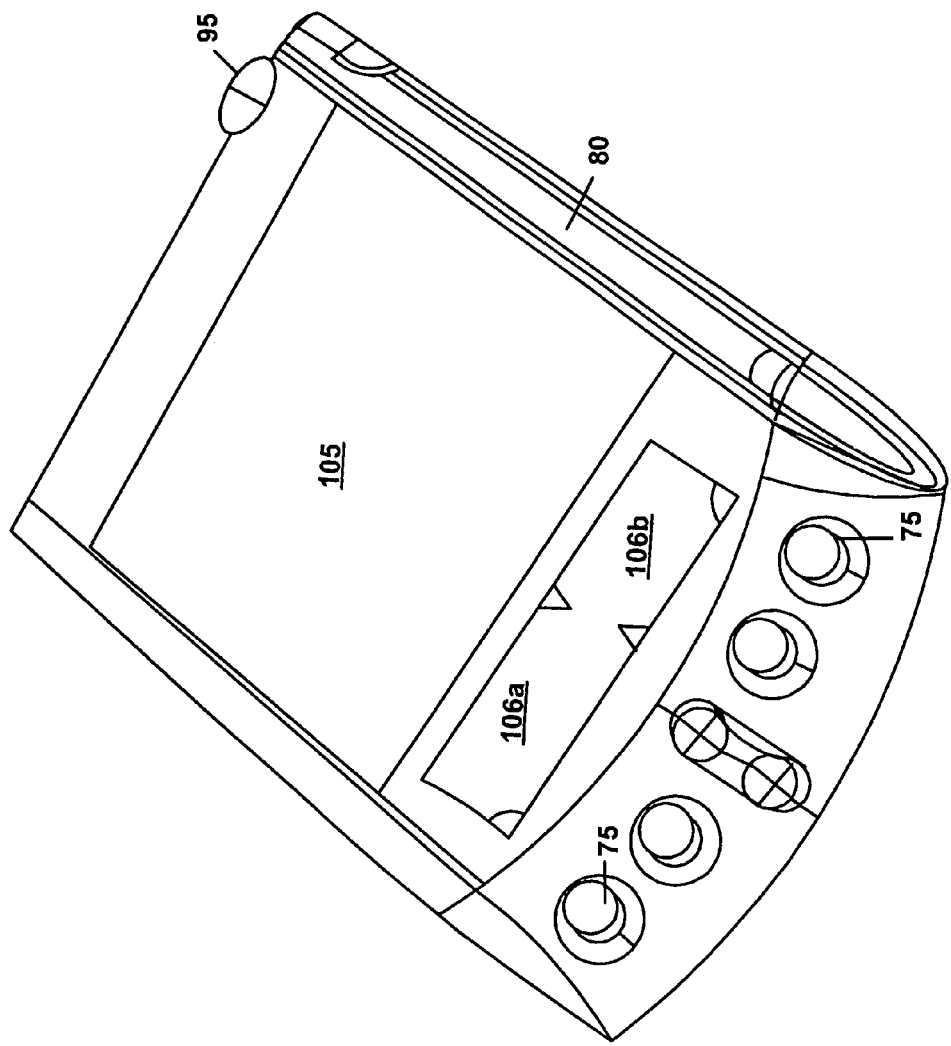
FIG. 2A is a top side perspective view of an exemplary personal digital assistant computer system.

With reference to FIG. 2A, a perspective illustration of the top face 100a of exemplary personal digital assistant computer system 100 is shown. The top face 100a contains a display screen 105 surrounded by a bezel or cover. A removable stylus 80 is also shown. The display screen 105 is a touch screen capable of registering contact between the screen and the tip of the stylus 80. The stylus 80 can be fabricated of any material which can make contact with the screen 105. The top face 100a also contains one or more dedicated and/or programmable buttons 75 for selecting information and causing the computer system 100 to implement functions. The on/off button 95 is also shown.

FIG. 2A also illustrates a handwriting recognition pad or "digitizer" containing regions 106a and 106b. Specifically, region 106a is for the drawing of alpha characters therein for automatic recognition and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 2B:
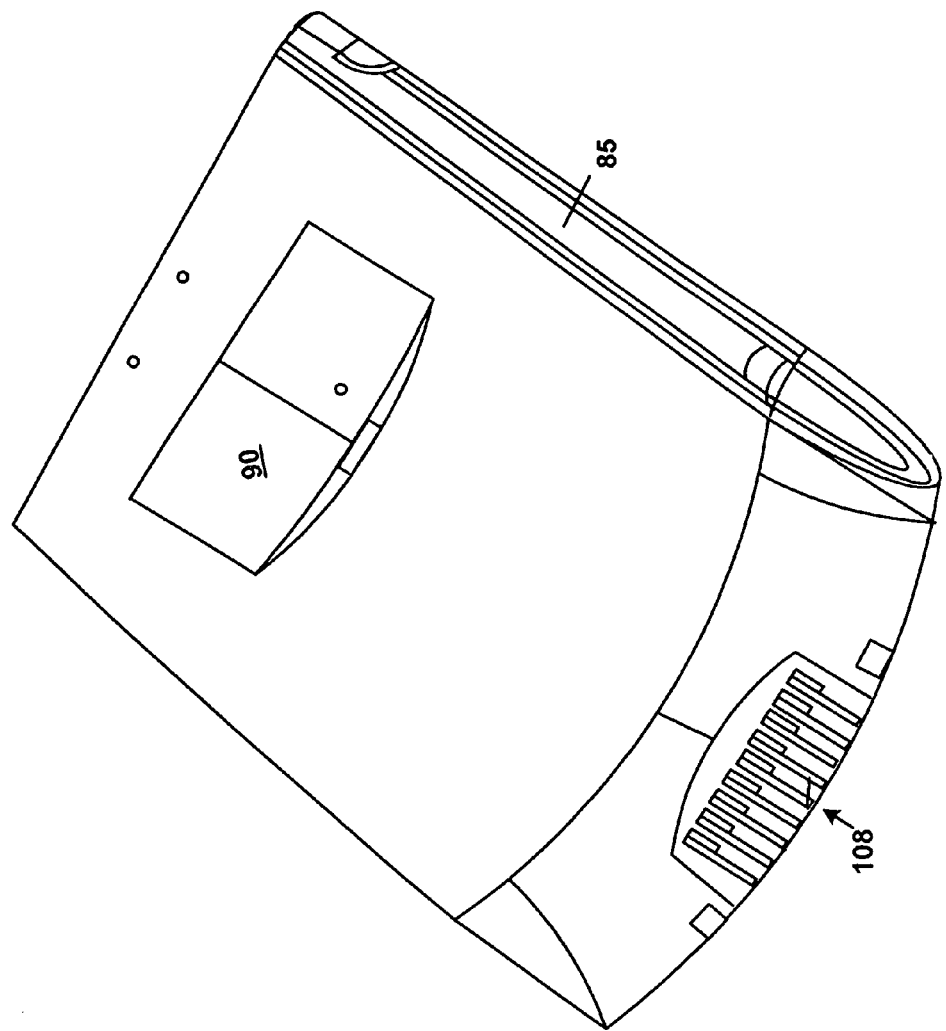
FIG. 2B is a bottom side perspective view of the personal digital assistant computer system of FIG. 2A.

FIG. 2B illustrates the bottom side 100b of one embodiment of the personal digital assistant computer system 100. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, small computer system interface (SCSI), Ethernet, Firewire (IEEE 1394), etc.

Figure 3:
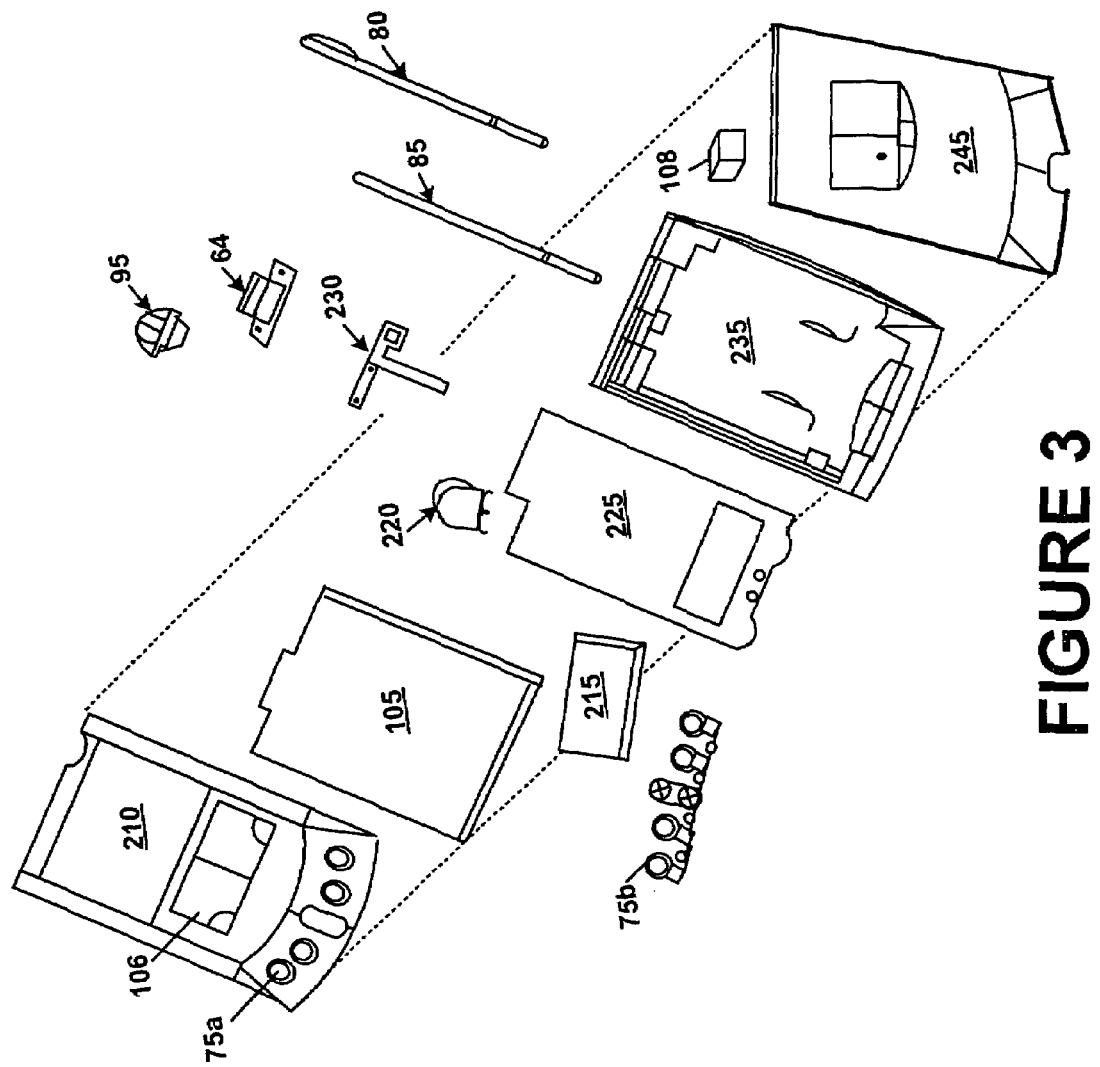
FIG. 3 is an exploded view of the components of the exemplary personal digital assistant computer system of FIG. 2A.

With reference now to FIG. 3, an exploded view of the exemplary personal digital assistant computer system 100 is shown. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission device (FED), plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. A midframe 235 is shown along with stylus 80. Position adjustable antenna 85 is also shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server.

Figure 4:
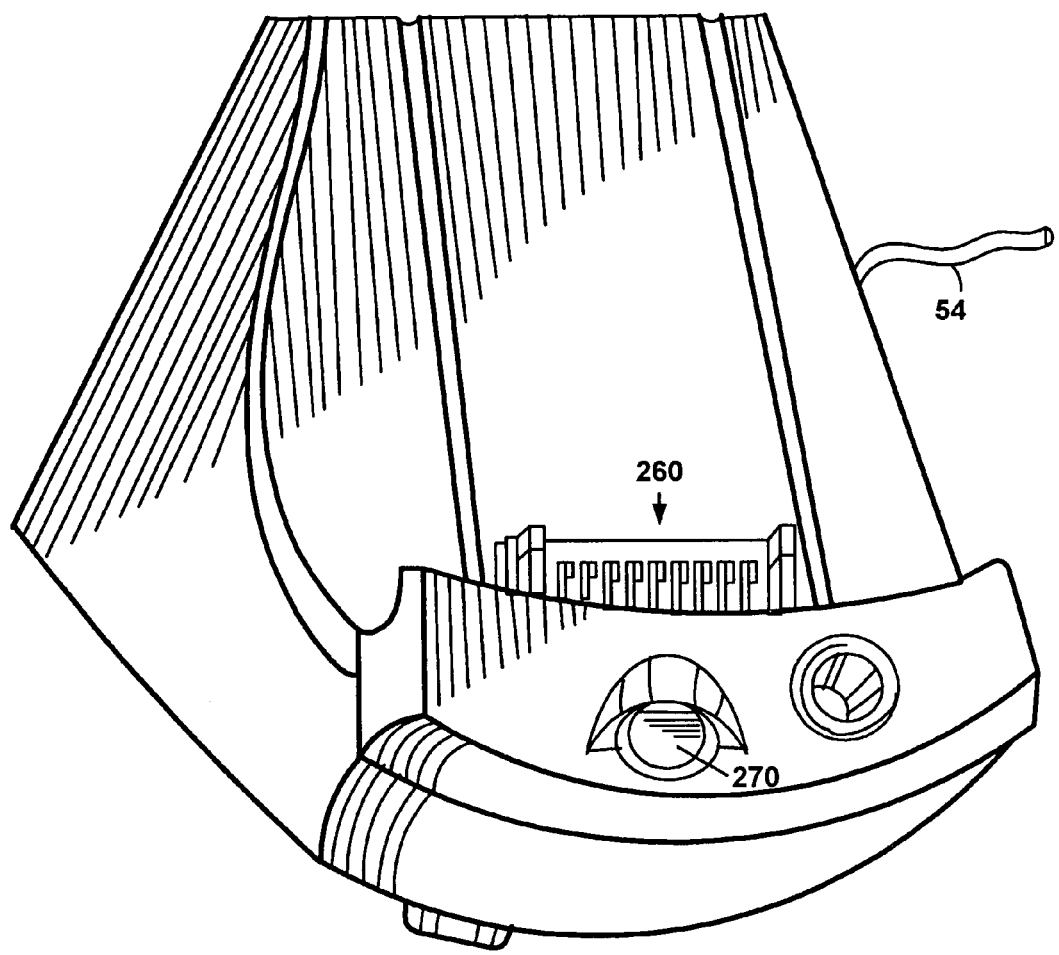
FIG. 4 is a perspective view of the cradle device for connecting the personal digital assistant computer system to other systems via a communication interface.

FIG. 4 is a perspective illustration of one embodiment of the cradle 60 for receiving the personal digital assistant computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication bus 54.

Figure 5:
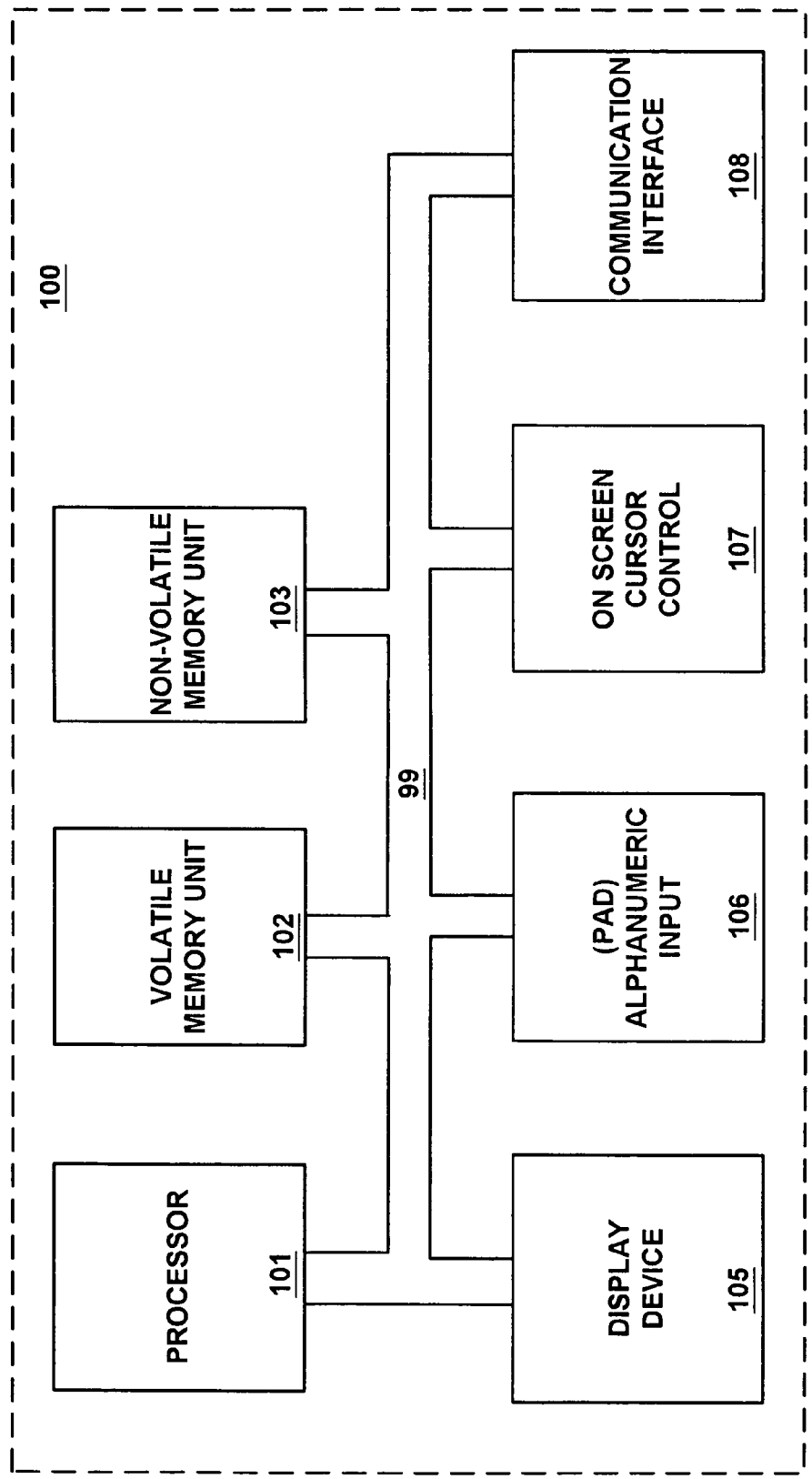
FIG. 5 is a logical block diagram of circuitry located within the exemplary personal digital assistant computer system of FIG. 2A.

FIG. 5 illustrates circuitry of exemplary personal digital assistant computer system 100, some of which can be implemented on PC board 225. Computer system 100 includes an address/data bus 99 for communicating information, a central processor 101 coupled with the bus 99 for processing information and instructions, a volatile memory unit 102 (e.g., random access memory, static RAM, dynamic RAM, etc.) coupled with the bus 99 for storing information and instructions for the central processor 101 and a non-volatile memory unit 103 (e.g., read only memory, programmable ROM, flash memory, EPROM, EEPROM, etc.) coupled with the bus 99 for storing static information and instructions for the processor 101. As described above, system 100 also contains a display device 105 coupled to the bus 99 for displaying information to the computer user. PC board 225 can contain the processor 101, the bus 99, the volatile memory unit 102, and the non-volatile memory unit 103. As described further below, portions of memory units 102 and 103 can be removed from computer system 100.

Also included in computer system 100 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. System 100 also includes an optional cursor control or directing device 107 coupled to the bus 99 for communicating user input information and command selections to the central processor 101. In one implementation, device 107 is a touch screen device incorporated with screen 105. Device 107 is capable of registering a position on the screen 105 where a stylus makes contact. The display device 105 utilized with the computer system 100 may be a liquid crystal device (LCD), cathode ray tube (CRT), field emission device (FED, also called flat panel CRT) or other display device suitable for creating graphic images and alphanumeric characters recognizable to the user. In the preferred embodiment, display 105 is a flat panel display. Computer system 100 also includes signal communication interface 108, which is also coupled to bus 99, and can be a serial port for communicating with the cradle 60. Device 108 can also include an infrared communication port.

Personality Card System in Accordance with the Present Invention

In the following description of embodiments of the present invention, a personality card is a peripheral component. Although some of the present embodiments specifically recite a personality card, the present invention is also well suited to an embodiment employing various other peripheral components.

Figure 6:
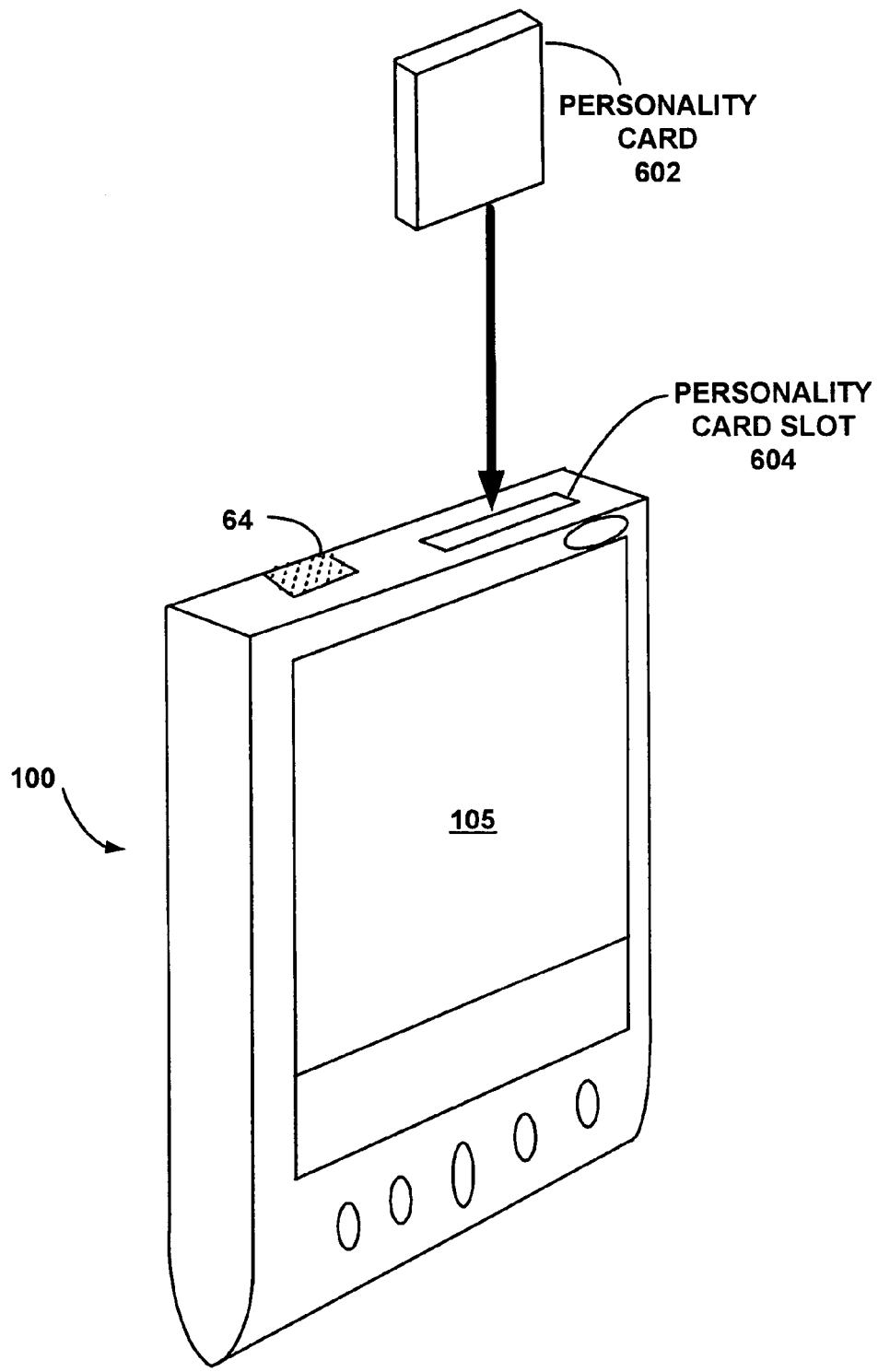
FIG. 6 is a perspective view of a personality card system in accordance with an embodiment of the present invention.

With reference now to FIG. 6, a perspective view of a personality card system 600 in accordance with one embodiment of the present invention is shown. The personality card system 600 of the present embodiment includes a personality memory card ("card") 602 and personal digital assistant computer system 100 implemented with a personality card slot 604. Specifically, personality card 602 is a removable expansion card about the size of a postage stamp (but in any case is approximately palm-sized) which plugs into personality card slot 604 of personal digital assistant system 100.

It should be appreciated that removable personality card 602 may store a wide variety of user data and software applications. For example, personality card 602 may store an address book database, calendar database, to-do-list database, memo pad database, expense list database, user applications, operating system, etc. Furthermore, when plugged into personality card slot 604, personality card 602 is electrically and communicatively coupled to personal digital assistant 100 and data stored therein can be viewed, accessed, updated, modified, added, deleted, etc., by personal digital assistant 100. In this manner, personality card 602 is capable of storing all of a user's private information and data which is usually stored within personal digital assistant 100. As such, by removing personality card 602 from slot 604 of personal digital assistant 100, all of the user's private information and data is removed from personal digital assistant 100. Furthermore, personal digital assistant 100 may be rendered totally or partially useless to a user once personality card 602 is uncoupled from it. In other words, personality card 602 is a module that totally or partially enables personal digital assistant 100 when plugged into slot 604.

For example, within one embodiment of personality card system 600 in accordance with the present invention, personal digital assistant 100 becomes a totally enabled device when personality card 602 is plugged into slot 604. However, without personality card 602 plugged into slot 604, personal digital assistant 100 cannot even be powered on. In this fashion, personal digital assistant 100 is totally and completely useless to a user without personality card 602.

Furthermore, within another embodiment of personality card system 600 in accordance with the present invention, personal digital assistant 100 becomes a partially enabled device when personality card 602 is removed from slot 604. For instance, even though personality card 602 is removed from personal digital assistant 100, a user is still able to power up personal digital assistant 100 and utilize its calculator functionality or browse the Internet. However, the user does not have access to the private information and data stored on personality card 602 because it has been removed from personal digital assistant 100. Therefore, when personality card 602 is plugged into slot 604, personal digital assistant 100 is enabled with the user's private information and data stored on personality card 602.

Referring still to FIG. 6, it is appreciated that personality card system 600 may be implemented with the additional security of a password protection system. One of the main functions of the password protection system of the present embodiment is to only grant access to the private information and data stored within personality card 602 to individuals who know a pre-established access password. Therefore, if personality card 602 is misplaced or lost and falls into the wrong hands, access to the stored private information is restricted to individuals who know the access password. Otherwise, access is denied to the private information and data stored within personality card 602. It should be appreciated that the password protection system of the present embodiment may be implemented as part of personality card 602 and/or personal digital assistant computer system 100. Furthermore, it is understood that the password protection system of the present embodiment may be implemented in a wide variety of ways.

There are several advantages associated with personality card system 600 in accordance with the present embodiment. For example, one of the advantages is that a user is able to restrict access to their stored private information and data by simply removing their personality card 602 from personal digital assistant 100. Furthermore, as personal digital assistants 100 equipped with personality card slots 604 become increasingly more common, a user will be able to continually carry around their personality card 602 and enable a spare and locally available personal digital assistant 100 with their private information and data when desired. Moreover, personality card system 600 of the present embodiment also facilitates an easier user upgrade to a better personal digital assistant. For instance, upon acquiring a better performing personal digital assistant, the user can easily transfer their private information and data into it by simply plugging their personality card 602 into the upgraded personal digital assistant.

With reference still to FIG. 6, it is understood that personality card 602 of the present embodiment is not strictly limited to the shape of a card. As such, personality card 602 may be implemented in a variety of shapes and sizes in accordance with the present embodiment with the eye on portability. Furthermore, it is appreciated that the function or functions of personality card 602 are well suited to be implemented in a wide variety of embodiments, some of which are described below.

Figure 7:
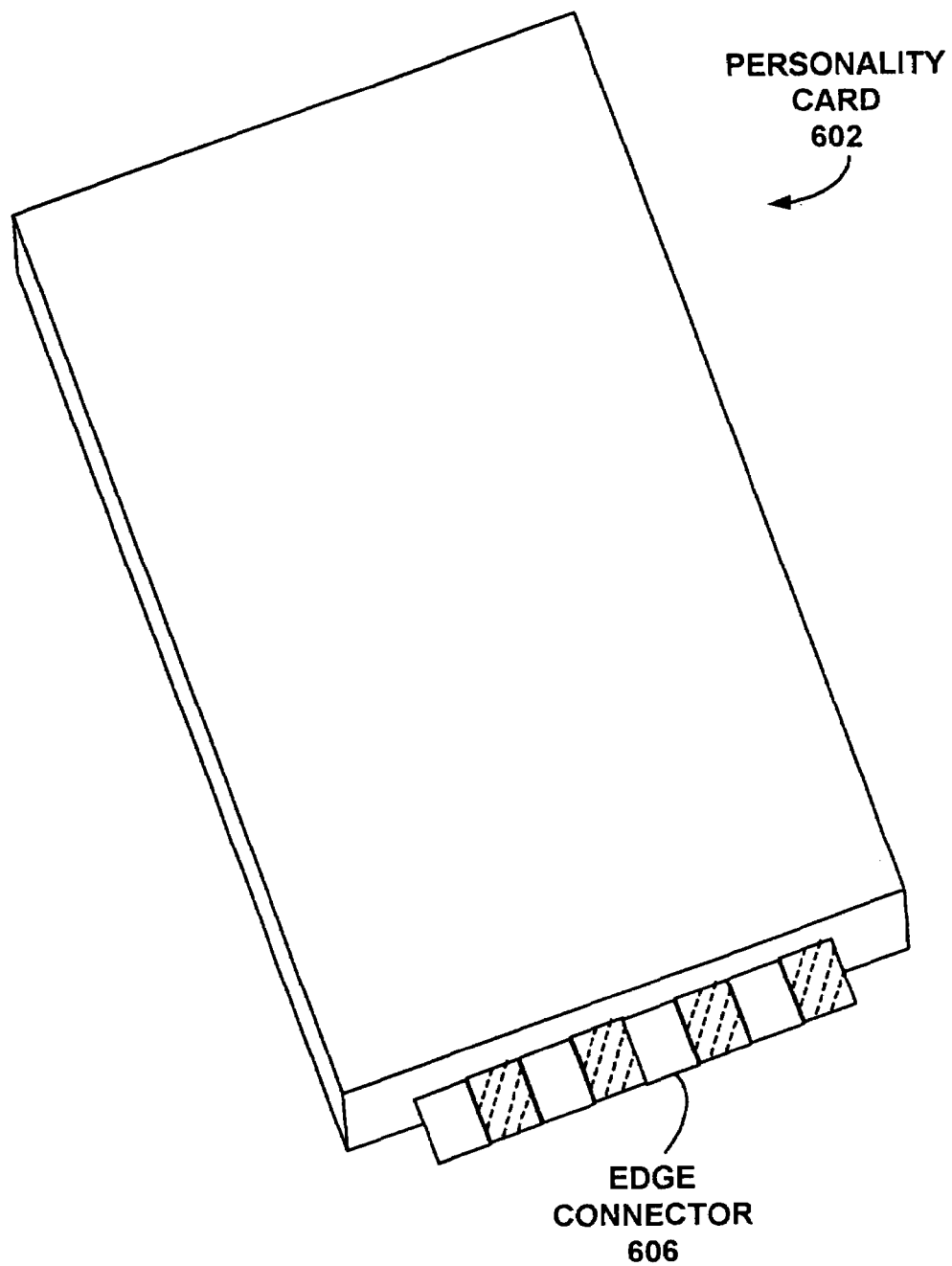
FIG. 7 is a perspective view of the removable personality card of FIG. 6 in accordance with one embodiment of the present invention.

Referring now to FIG. 7, a perspective view of personality card 602 of FIG. 6 in accordance with one embodiment of the present invention is shown. The personality card 602 is a removable expansion card about the size of a postage stamp designed in one embodiment to slide into and couple to personality card slot 604 of personal digital assistant 100. Specifically, personality card 602 in one embodiment may be fabricated with a thickness of substantially 1.5 millimeters, a width of substantially 20 millimeters, and a length of substantially 30 millimeters. However, many other physical dimensions may be used to fabricate personality card 602 in accordance with the present embodiment. Additionally, personality card 602 includes an edge connector 606 which is electrically coupled to internal circuitry (not shown) of personality card 602. As such, when personality card 602 is slid into personality card slot 604, edge connector 606 subsequently plugs into an internal receiving slot (not shown) of personality card slot 604. In this manner, personality card 602 is electrically and communicatively coupled to personal digital assistant 100.

Figure 8A:
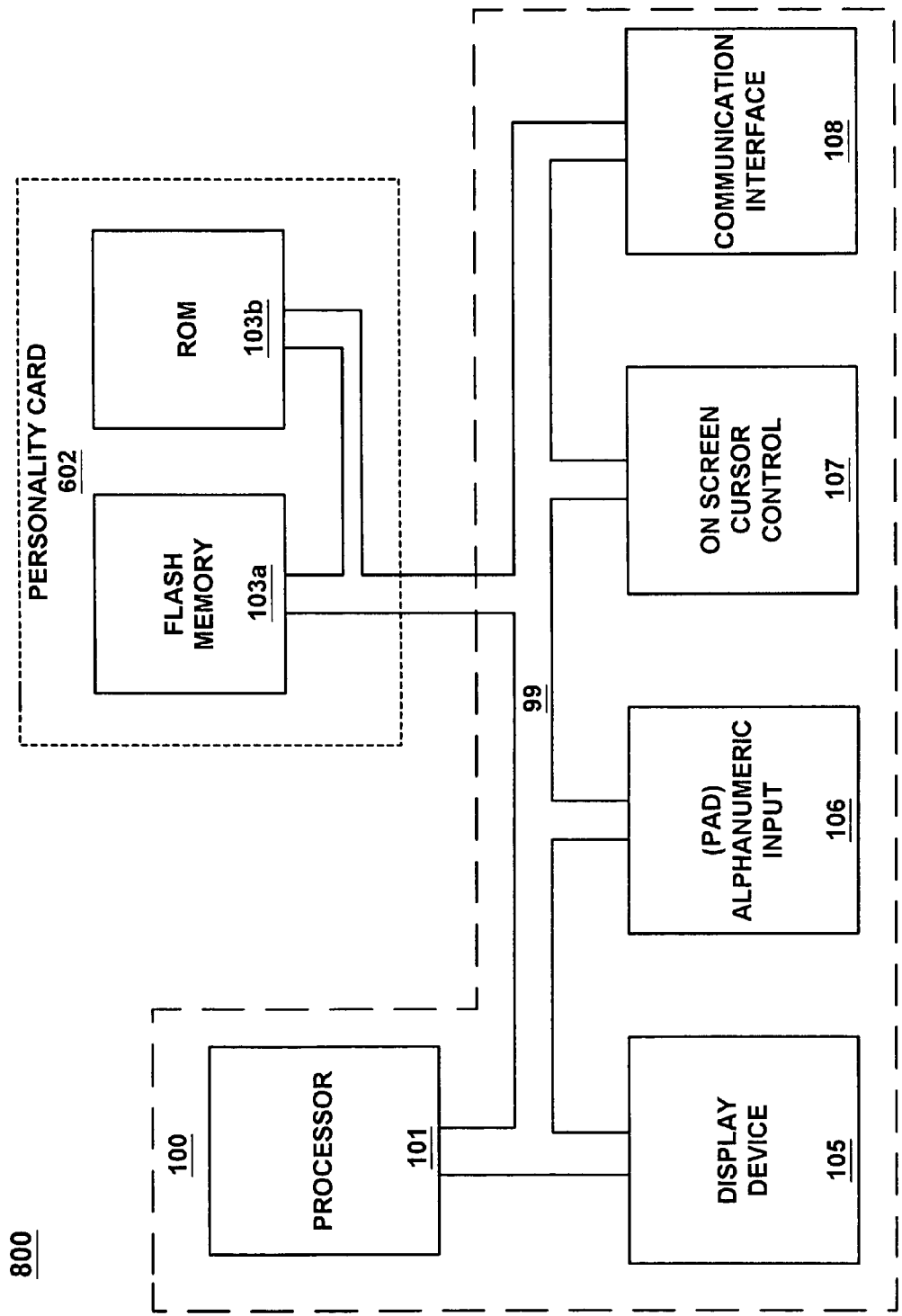
FIG. 8A is a logical block diagram of circuitry located within the personality card system of FIG. 6 in accordance with one embodiment of the present invention.

With reference to FIG. 8A, a logical block diagram of circuitry 800 located within personality card system 600 in accordance with one embodiment of the present invention is shown. Within the present embodiment, removable personality card 602 is a module that totally enables personal digital assistant 100 when plugged into card slot 604 (FIG. 6). As such, personal digital assistant 100 becomes a totally enabled device when personality card 602 is plugged into slot 604. However, without personality card 602 plugged into slot 604, personal digital assistant 100 cannot perform any functionality useful to a user. Furthermore, the user does not have access to the private information and data stored on personality card 602 once it is removed from personal digital assistant 100.

Specifically, personal digital assistant 100 is implemented with processor 101, display device 105, alphanumeric input 106, cursor control 107, communication interface 108, and bus 99 which are described above. However, personal digital assistant 100 is not implemented with any significant memory capacity. As such, removable personality card 602 is implemented with read only memory (ROM) 103b which is capable of storing the software operating system and software applications of personal digital assistant computer system 100. Furthermore, personality card 602 is also implemented with flash memory 103a which is capable of storing the private information and data entered by a user of personal digital assistant 100. Therefore, personal digital assistant 100 is able to function normally when personality card 602 is plugged into slot 604. Conversely, personal digital assistant 100 is an inoperative device when personality card 602 is uncoupled and removed from slot 604. More specifically, since the operating system of personal digital assistant 100 is stored on personality card 602, personal digital assistant 100 is unable to boot-up or function in any manner useful to a user when personality card 602 is removed from slot 604.

Referring to FIG. 8A, it is appreciated that when personality card 602 is plugged into personality card slot 604 of personal digital assistant 100, flash memory 103a and ROM 103b are communicatively coupled to bus 99. Furthermore, it should be understood that personality card 602 of the present embodiment is well suited to be implemented with any type, amount, or configuration of memory.

With reference now to FIG. 8B, a logical block diagram of circuitry 802 located within personality card system 600 in accordance with one embodiment of the present invention is shown. Within the present embodiment, personality card 602 is a module, which partially enables personal digital assistant 100 when plugged into personality card slot 604 (FIG. 6). That is, when removable personality card 602 is plugged into slot 604 of personal digital assistant 100, a user is able to utilize the private information and data stored on personality card 602. Conversely, when personality card 602 is removed from slot 604, the user does not have access to the private information and data stored on personality card 602. However, the user is still able to power up personal digital assistant 100 and utilize some of its functionality (e.g., Internet browser, calculator, etc.). In this manner, personality card 602 partially enables personal digital assistant 100 when plugged into slot 604.

Specifically, personal digital assistant 100 is implemented with processor 101, display device 105, alphanumeric input 106, cursor control 107, communication interface 108, and bus 99 which are described above. Additionally, personal digital assistant 100 is implemented with a non-volatile memory unit 103a (e.g., flash memory, read only memory, etc.) which is capable of storing the software operating system and software applications of personal digital assistant 100. The personality card 602 is implemented with a non-volatile memory unit 103*b* (e.g., flash memory, EPROM, etc.) which is capable of storing the private information and data entered by a user of personal digital assistant 100. Therefore, personal digital assistant 100 is able to function normally when personality card 602 is plugged into card slot 604. However, personal digital assistant 100 is a partially inoperative device when personality card 602 is removed from slot 604. That is, the user does not have access to the private information and data stored on personality card 602 when it is removed from personal digital assistant computer system 100.

With reference still to FIG. 8B, it is understood that when personality card 602 is plugged into personality card slot 604 of personal digital assistant 100, non-volatile memory unit 103*b* is communicatively coupled to bus 99. Moreover, it should be appreciated that personality card 602 of the present embodiment is well suited to be implemented with any type, amount, or configuration of memory.

Figure 8C:
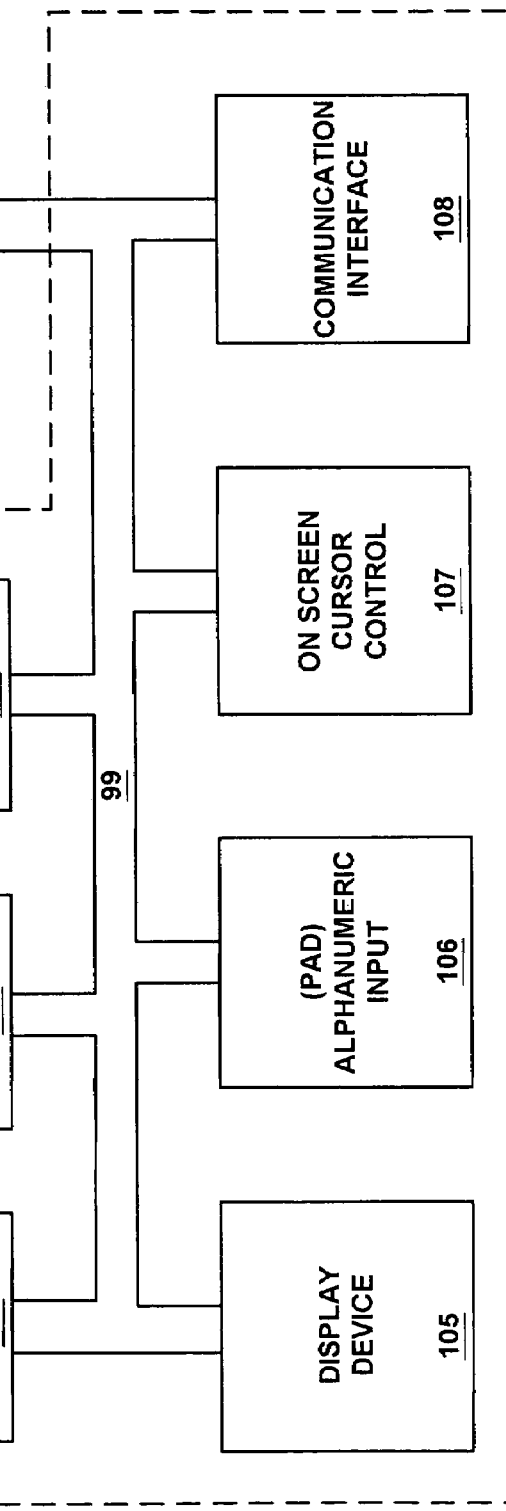
FIG. 8C is a logical block diagram of circuitry located within the personality card system of FIG. 6 in accordance with yet another embodiment of the present invention.

Now referring to FIG. 8C, a logical block diagram of circuitry 804 located within personality card system 600 in accordance with one embodiment of the present invention is shown. The personality card 602 of the present embodiment is a module which partially enables personal digital assistant 100 when plugged into card slot 604 (FIG. 6). In other words, when removable personality card 602 is plugged into slot 604 of personal digital assistant 100, a user is able to utilize the private information and data stored on personality card 602. Conversely, when personality card 602 is removed from slot 604, the user does not have access to the private information and data stored on personality card 602. However, the user is still able to power up personal digital assistant 100 and utilize some of its functionality (e.g., Internet browser, calculator, etc.). In this manner, personality card 602 partially enables personal digital assistant 100 when plugged into slot 604.

Specifically, personal digital assistant 100 is implemented with processor 101, display device 105, alphanumeric input 106, cursor control 107, communication interface 108, and bus 99 which are described above. Moreover, personal digital assistant 100 is implemented with a volatile memory unit 102 (e.g., random access memory, dynamic RAM, etc.) and a non-volatile memory unit 103*a* (e.g., flash memory, read only memory, etc.). The non-volatile memory unit 103*a* is capable of storing the software operating system and software applications of personal digital assistant 100. The volatile memory unit 102 is capable of storing the private information and data entered by a user of personal digital assistant 100. Furthermore, personality card 602 is implemented with a non-volatile memory unit 103*b* (e.g., flash memory, EPROM, etc.) which is also capable of storing the private user information and data entered by the user of personal digital assistant 100.

Referring still to FIG. 8C, it should be appreciated that when personality card 602 is uncoupled from or plugged into personality card slot 604 of personal digital assistant computer system 100, a synchronization process occurs between personality card 602 and personal digital assistant computer system 100. Specifically, the synchronization process of the present embodiment reconciles private user data (for example) stored by non-volatile memory unit 103*b* of personality card 602 with corresponding private user data stored by volatile memory unit 102 of personal digital assistant computer system 100. Once the synchronization process is completed, the user data stored by personality card 602 is synchronized with the private user data stored by personal digital assistant computer system 100.

It should be appreciated that before personality card 602 is able to be removed from personality card slot 604 (FIG. 6) of personal digital assistant 100, the synchronization process described above is initiated. Once the synchronization process is completed, all of the private user information and data stored by volatile memory unit 102 is then erased thereby enabling personality card 602 to be uncoupled and removed from personal digital assistant 100. In this manner, a user of personal digital assistant 100 does not have access to any private user information once personality card 602 is removed from slot 604 of personal digital assistant 100.

Within the present embodiment of FIG. 8C, the synchronization of user data described above may be implemented in a manner described in: U.S. Pat. No. 5,727,202, Issued on Mar. 10, 1998, entitled "Method and Apparatus for Synchronizing Information on Two Different Computer Systems," by Gregory R. Kucala; U.S. Pat. No. 5,832,489, Issued on Nov. 3, 1998, entitled "Method and Apparatus for Synchronizing Information on Two Different Computer Systems," by Gregory R. Kucala; U.S. Pat. No. 5,884,323, Issued on Mar. 16, 1999, entitled "Extendible Method and Apparatus for Synchronizing Files on Two Different Computer Systems," by Hawkins et al.; U.S. Pat. No. 6,000,000, Issued on Dec. 7, 1999, entitled "Extendible Method and Apparatus for Synchronizing Multiple Files on Two Different Computer Systems," by Hawkins et al.; and U.S. Pat. No. 6,006,274, Issued on Dec. 21, 1999, entitled "Method and Apparatus Using a Pass Through Personal Computer Connected to Both a Local Communication Link and a Computer Network for Identifying and Synchronizing a Preferred Computer with a Portable Computer," by Hawkins et al., which are all herein incorporated by reference.

With reference still to FIG. 8C, it is appreciated that when personality card 602 is plugged into personality card slot 604 of personal digital assistant 100, non-volatile memory unit 103*b* is communicatively coupled to bus 99. Furthermore, it is understood that personality card 602 of the present embodiment is well suited to be implemented with any type, amount, or configuration of memory.

Figure 8D:
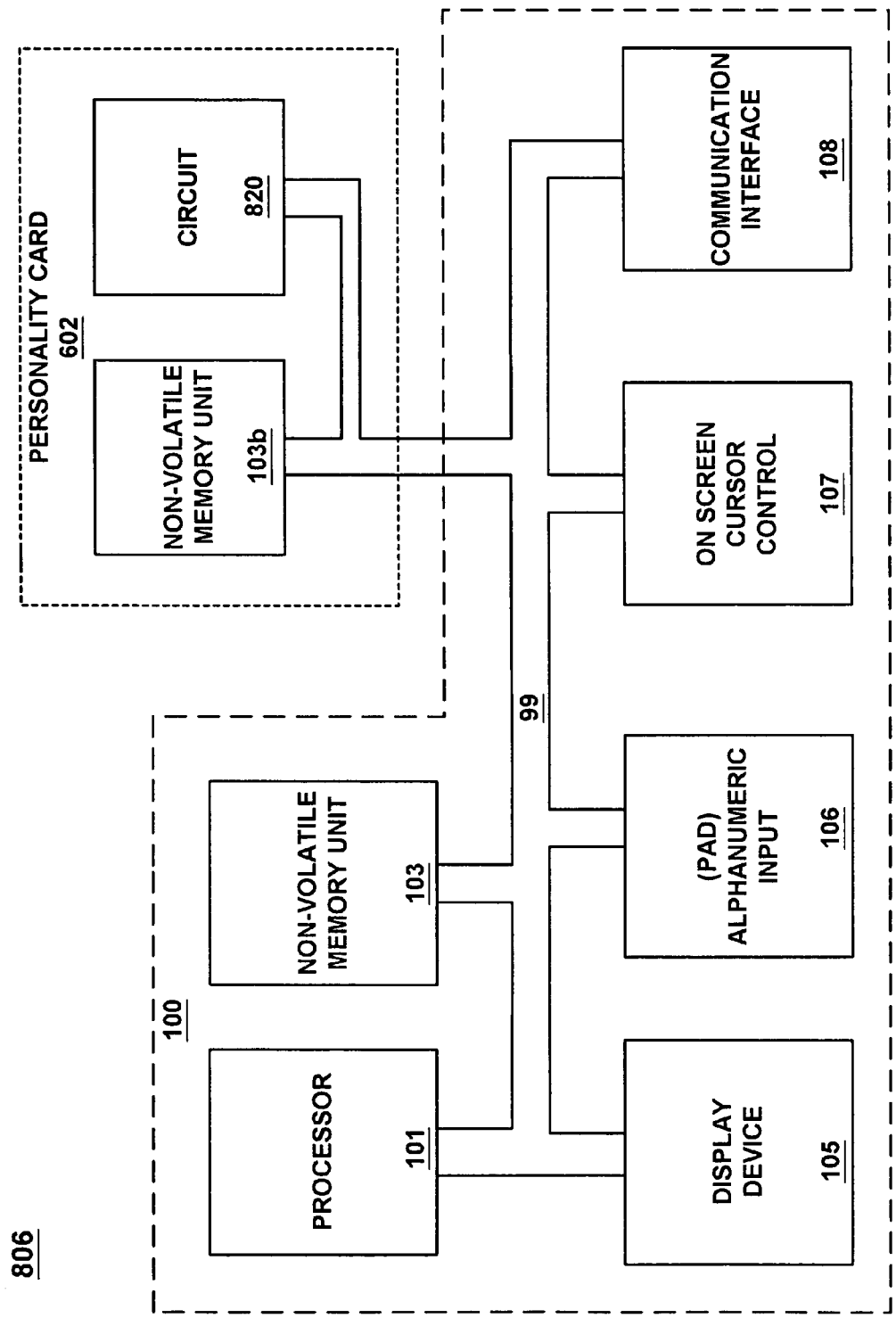
FIG. 8D is a logical block diagram of circuitry located within the personality card system of FIG. 6 in accordance with still yet another embodiment of the present invention.

Referring now to FIG. 8D, a logical block diagram of circuitry 806 located within personality card 602 in accordance with one embodiment of the present invention is shown. Within the present embodiment, personality card 602 is a module that totally enables personal digital assistant 100 when plugged into slot 604 (FIG. 6). That is, personal digital assistant 100 becomes a totally enabled device when removable personality card 602 is plugged into slot 604. However, without personality card 602 plugged into slot 604, personal digital assistant 100 cannot even be powered on. In this fashion, personal digital assistant 100 is completely and totally useless to a user without personality card 602. Furthermore, the user does not have access to the private information and data stored on personality card 602 once it is removed from personal digital assistant 100.

Specifically, personal digital assistant 100 is implemented with processor 101, display device 105, alphanumeric input 106, cursor control 107, communication interface 108, and bus 99 which are described above. Additionally, personal digital assistant 100 is implemented with a non-volatile memory unit 103*a* (e.g., flash memory, read only memory, etc.) which is capable of storing the software operating system and software applications of personal digital assistant 100. The personality card 602 is implemented with non-volatile memory unit 103*b* (e.g., flash memory, EPROM, etc.) which is capable of storing the private information and data entered by a user of personal digital assistant 100. Moreover, personality card 602 is also implemented with a circuit 820. It should be appreciated that when personal digital assistant 100 is not coupled to circuit 820 of personality card 602, personal digital assistant 100 is inoperative and cannot be powered on. More specifically, within personal digital assistant 100 there is an open circuit (not shown) which does not allow personal digital assistant 100 to be powered on. However, when personality card 602 is plugged into slot 604 of personal digital assistant 100, circuit 820 closes the previously open circuit enabling personal digital assistant 100 to be powered on. Therefore, personality card 602 is a module which totally enables personal digital assistant 100 when plugged into slot 604.

Referring still to FIG. 8D, it is appreciated that when personality card 602 is plugged into personality card slot 604 of personal digital assistant 100, non-volatile memory unit 103b and circuit 820 are electrically coupled to bus 99. Furthermore, it should be understood that personality card 602 of the present embodiment is well suited to be implemented with any type, amount, or configuration of memory. Moreover, circuit 820 of the present embodiment is well suited to be implemented with any type or configuration of wiring and/or circuitry.

Figure 9:
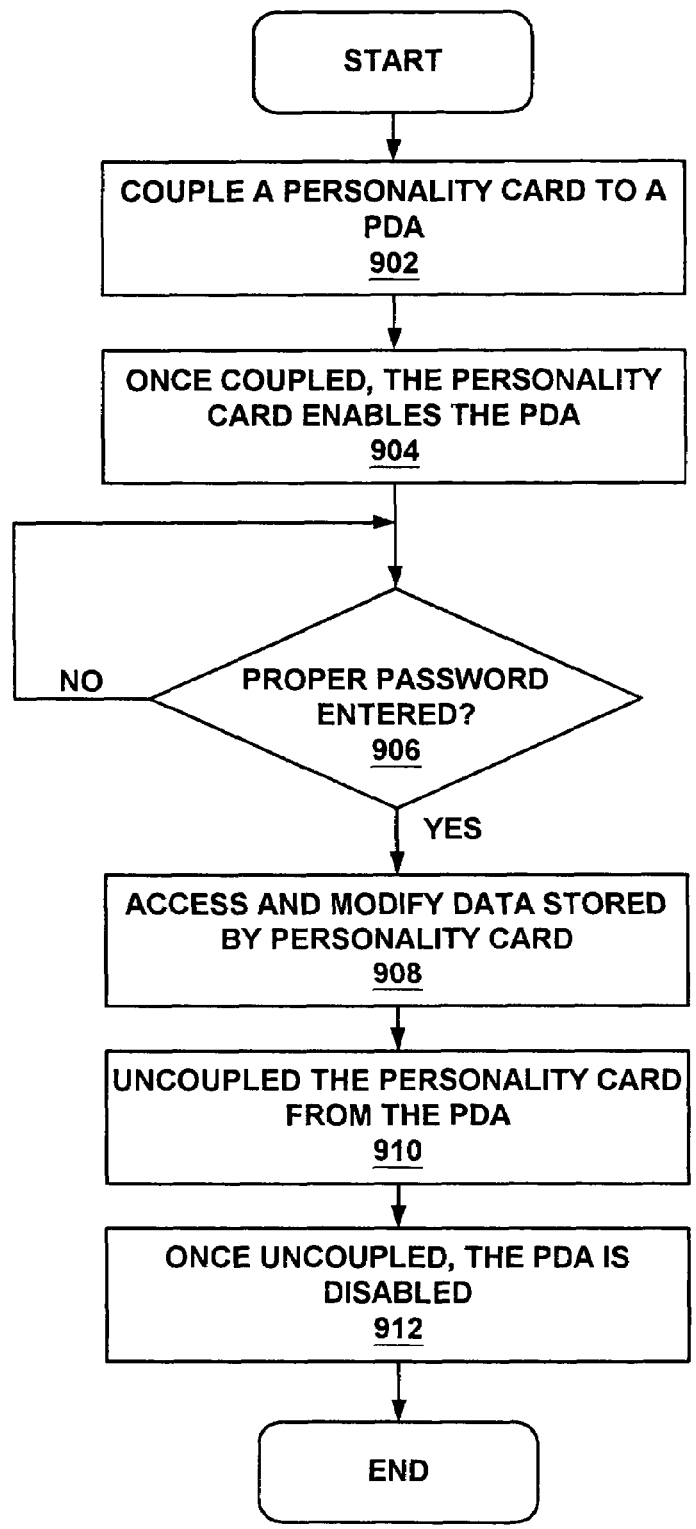
FIG. 9 is a flowchart of steps performed in accordance with one embodiment of the present invention for enabling and disabling a personal digital assistant computer system.

With reference to FIG. 9, a flowchart 900 of steps performed in accordance with one embodiment of the present invention for enabling and disabling a personal digital assistant computer system is shown. Although specific steps are disclosed within flowchart 900, such steps are exemplary. That is, the present embodiment is well suited to performing various other steps or variations of the steps recited within FIG. 9.

At step 902, within the present embodiment a removable personality card (e.g., 602) is coupled to a personal digital assistant computer system (e.g., 100). It is appreciated that the personality card may be coupled to the personal digital assistant computer system in a wide variety of ways in accordance with the present embodiment. For example, the personal digital assistant computer system may be implemented with a personality card slot (e.g., 604) wherein the removable personality card can be plugged into. By plugging the personality card into the personality card slot, the personal digital assistant computer system is communicatively coupled to the personality card.

In step 904 of FIG. 9, once the personality card is coupled to the personal digital assistant computer system within the present embodiment, the personality card enables the personal digital assistant computer system. Within the present embodiment, the personality card may enable the personal digital assistant computer system in a variety of different ways. For example, the personality card may enable the personal digital assistant computer system to operate or be powered on. Additionally, the personality card may enable the personal digital assistant computer system with private user information and data which is stored by the personality card.

At step 906, the present embodiment initiates an optional password protection system and determines whether a proper password has been entered by a user of the personal digital assistant computer system. If the present embodiment determines that the proper password has not been entered by the user, the present embodiment proceeds to the beginning of step 906. However, if the present embodiment determines that the proper password has been entered by the user, the present embodiment proceeds to step 908.

In step 908 of FIG. 9, within the present embodiment the private user information and data stored by the personality card can be viewed, accessed, updated, modified, added, deleted, etc., by the user of the personal digital assistant computer system. It is appreciated that the removable personality card may store a wide variety of user data and software applications. For example, the personality card may store an address book database, calendar database, to-do-list database, memo pad database, expense list database, user software applications, operating system, etc.

At step 910, within the present embodiment the removable personality card is uncoupled from the personal digital assistant computer system. For example, the personality card may be unplugged and removed from a personality card slot of the personal digital assistant computer system. In step 912, once the personality card is uncoupled from the personal digital assistant computer system within the present embodiment, the personal digital assistant computer system is disabled. Within the present embodiment, the personal digital assistant computer system may be disabled in a variety of different ways. For example, when the personal digital assistant computer system is disabled it may not be able to operate or even be powered on. Moreover, when the personal digital assistant computer system is disabled it may not have access to private user information and data because such information is stored on the removable personality card (which has been uncoupled from the personal digital assistant computer system).

It is appreciated that there are several advantages associated with a personality card system in accordance with the present invention. For example, one of the advantages is that a user is able to restrict access to their stored private information and data by simply removing their personality card from their personal digital assistant. Furthermore, as personal digital assistants equipped with personality card slots become increasingly more common, a user will be able to continually carry around their personality card and enable a spare personal digital assistant with their private information when desired.

Accordingly, the present invention provides a method and system for restricting access to private information stored by a personal digital assistant.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A personal digital assistant computer system with restricted data access and controlled functionality, said system comprising:

a personal digital assistant computer that is unable to execute a first set of software applications on said personal digital assistant and able to execute a second set of software applications on said personal digital assistant;

a peripheral component adapted to be coupled to said personal digital assistant computer, said peripheral component comprising a security access code and a memory device that stores a software application to execute on said personal digital assistant computer to provide expanded functionality and personal user data for use when coupled with said personal digital assistant computer;

wherein in response to said peripheral component uncoupling from said personal digital assistant computer system, said personal digital assistant computer is unable to execute a first set of software applications on said personal digital assistant and able to execute a second set of software applications on said personal digital assistant.

2. The system as described in claim 1 wherein said software application stored on said memory device comprises a software operating system for said personal digital assistant computer system.

3. The system as described in claim 1 wherein said memory device comprises a non-volatile memory.

4. The system as described in claim 3 wherein said non-volatile memory comprises flash memory.

5. The system as described in claim 1 wherein said peripheral component further comprises a circuit adapted for enabling said personal digital assistant computer to power on.

6. A system according to claim 1, wherein said peripheral component is adapted for coupling to any of a plurality of personal digital assistant computers.

7. A system according to claim 1, wherein at least one form of said personal user data is stored exclusively in said personal digital assistant computer.

8. A system according to claim 1, wherein said peripheral component and said personal digital assistant computer are adapted for plug in consideration.

9. A system according to claim 1 wherein said personal user data comprises substantially all of a users private data for said personal digital assistant computer system.

10. A portable computer system with restricted data access, said system comprising:
   a portable computer configured to be incapable of executing a first set of operations while capable of executing a second set of operations, comprising:
      a processor coupled to a bus;
      a display device coupled to said bus; and
      a receiving slot coupled to said bus;
   a peripheral component adapted to be coupled to said portable computer to enable the execution of said first set of operations, said peripheral component comprising a security access code and a memory device that stores a software application to execute on said portable computer and personal user data for use within the portable computer; and
   wherein in response to said peripheral component uncoupling from said portable computer, said portable computer requires entry of a security access code before executing operations on the portable computer system.

11. The system as described in claim 10 wherein said software application comprises a software operating system for said portable computer.

12. The system as described in claim 10 wherein said memory device stores user data other than user personal data.

13. The system as described in claim 10 wherein said peripheral component enables said portable computer with user data.

14. The system as described in claim 13 wherein said user data comprises an address book, calendar database, to-do-list database, memo pad or an expense list database.

15. The system as described in claim 10 wherein said peripheral component further comprises a circuit for enabling said portable computer to power on.

16. A personal digital assistant computer system with restricted data access comprising:
   a personal digital assistant computer including a processor, a display device, an input, a cursor control, communication interface, a bus and a limited memory for storing operating software and software applications;
   a personality card including memory for storing private information, software to execute on said personal digital assistant, and data entered by a user; and
   a coupling for interfacing said personal digital assistant computer with said personality card for interrelated operation as a system.

17. A system according to claim 16 wherein said coupling comprises a mechanical plug structure.

18. A system according to claim 16 wherein said private information, software to execute on said personal data assistant, and data entered by a user comprises substantially all such data in said system.

19. A system according to claim 16 wherein said personality card memory stores a software application to execute on said personal digital assistant computer.

* * * * *